Jan. 31, 1967 C. W. BOPP 3,301,416
COMBINATION VEHICLE TRAILER AND LIFTING DEVICE
Filed Aug. 3, 1964 4 Sheets-Sheet 1

INVENTOR
CECIL W. BOPP
BY
Dick & Farley
ATTORNEYS

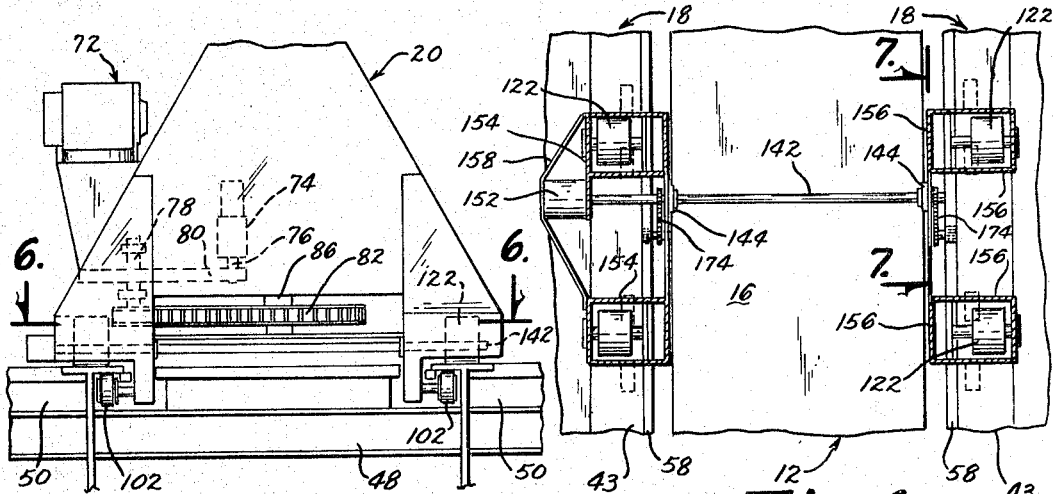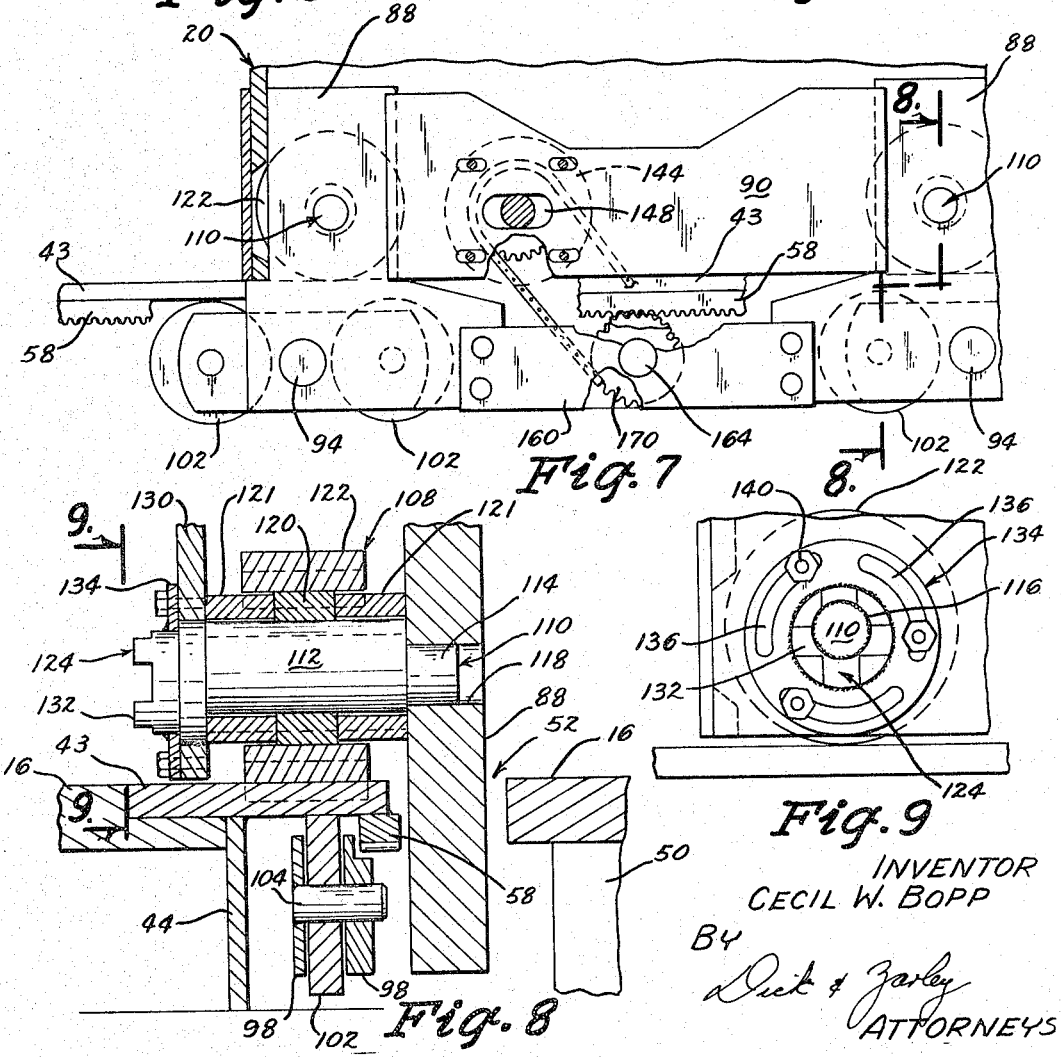

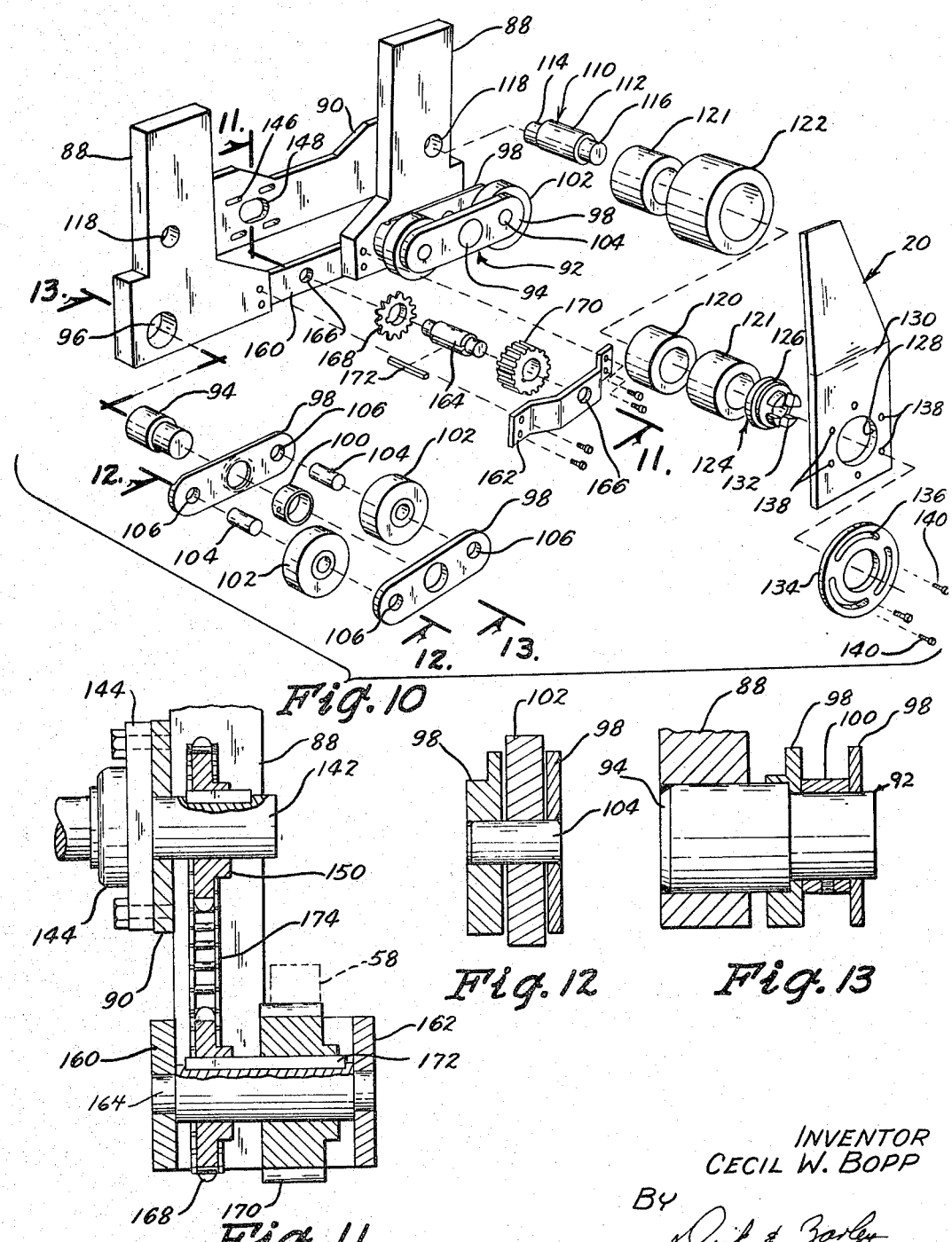

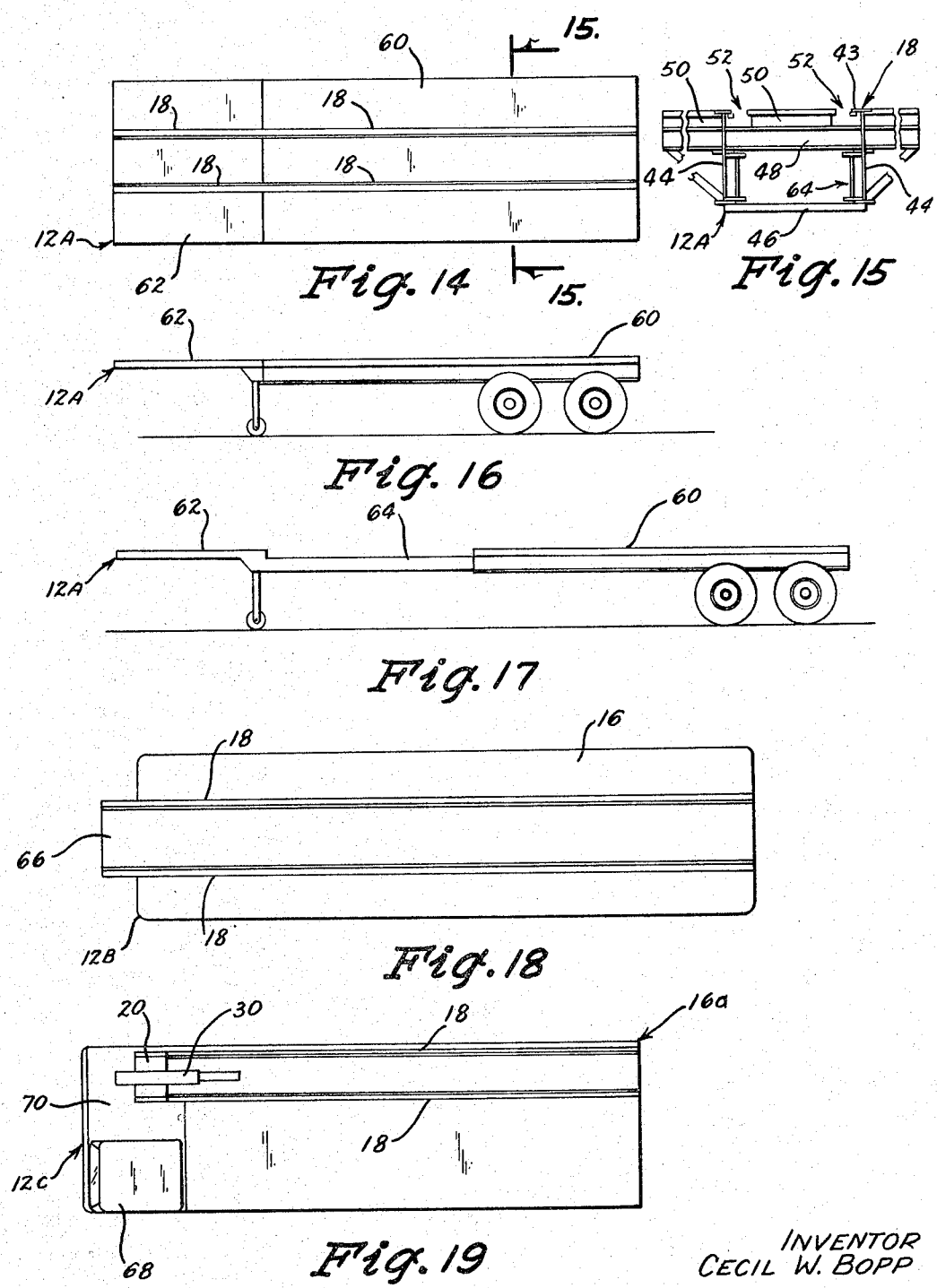

United States Patent Office 3,301,416
Patented Jan. 31, 1967

3,301,416
COMBINATION VEHICLE TRAILER AND
LIFTING DEVICE
Cecil W. Bopp, Waterloo, Iowa, assignor to The Greater
Iowa Corporation, Des Moines, Iowa, a corporation of
Iowa
Filed Aug. 3, 1964, Ser. No. 387,012
7 Claims. (Cl. 214—75)

This invention has as a principal object the provision of a loading and unloading device for vehicle trailers which can accomplish all of the lifting and moving functions that normally would be included in loading and unloading a trailer unit with a variety of equipment or material. These lifting and moving functions include the raising, lowering, tilting and telescoping of a boom unit, and the rectilinear and rotational displacement of the pedestal upon which it is mounted.

A further object of this invention is to provide a trailer loading and unloading device that can be selectively detachably and movably mounted on a trailer unit so as to be able to perform the lifting function when desired along the length of the trailer, but to permit its complete detachment from the trailer when its presence was not required.

A still further object of this invention is to provide a trailer loading and unloading device that can be adapted for movement on trailers having various deck plate thicknesses without causing any adjustment in the hydraulic or mechanical linkage for moving the device.

Still further objects of this invention are to provide a combination vehicle trailer and lifting device that is economical in manufacture, durable in use, and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIGURE 5 is an enlarged scale rear elevational view of the pedestal and trailer as viewed on line 5—5 of FIGURE 2;

FIGURE 6 is a partial sectional view of the pedestal and trailer taken on line 6—6 of FIGURE 5;

FIGURE 7 is an enlarged scale sectional view of the rotor assembly and drive mechanism for the pedestal and is taken on line 7—7 of FIGURE 6;

FIGURE 8 is a further sectional view of the rotor assembly and drive mechanism for the pedestal as taken on line 8—8 of FIGURE 7;

FIGURE 9 is an elevational view of the eccentric adjusting means for the upper rotor assembly as taken on line 9—9 of FIGURE 8;

FIGURE 10 is a schematic perspective view of the upper and lower pedestal roller assemblies and drive mechanism;

FIGURE 11 is an assembled sectional view of the drive mechanism as taken on line 11—11 of FIGURE 10;

FIGURE 12 is an assembled sectional view of the lower roller as taken on line 12—12 of FIGURE 10;

FIGURE 13 is an assembled sectional view of the lower roller assembly as taken on line 13—13 of FIGURE 10;

FIGURE 14 is a plan view of an alternate trailer unit;

FIGURE 15 is a sectional view of the trailer in FIGURE 14 as taken on line 15—15 of FIGURE 14;

FIGURE 16 is a side elevational view of the trailer of FIGURE 14;

FIGURE 17 is a side elevational view of the trailer of FIGURE 14 but in an expanded condition;

FIGURE 18 is a plan view of a further alternate trailer unit; and

FIGURE 19 is a plan view of a still further alternate trailer unit.

Figure 1:
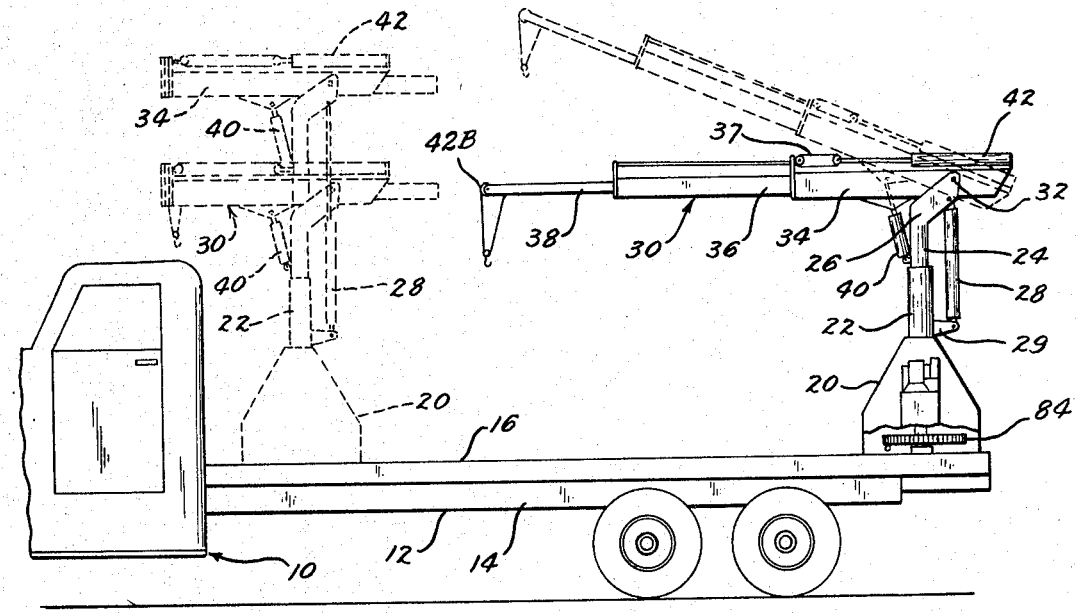
FIGURE 1 is a side elevational view of the device of this invention with the dotted lies thereof showing alternate positions of the lifting mechanism.
Figure 2:
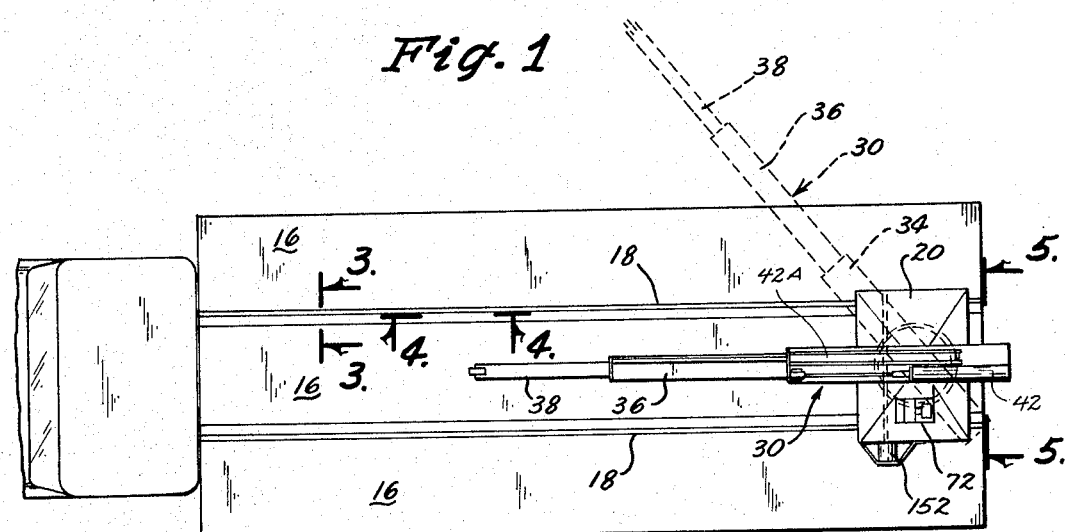
FIGURE 2 is a plan view of the device of FIGURE 1.

With reference to FIGURES 1 and 2, the numeral 10 generally designates a truck vehicle including a wheel supported trailer 12. Trailer frame 14 has a bed 16 secured to the upper portion thereof. Parallel tracks 18, which will be discussed in more detail hereafter, are symmetrically positioned on the center portion of the bed 16. Pedestal 20, as will be indicated hereafter, is movably mounted on tracks 18. Vertical cylindrical post 22 is secured to the upper portion of pedestal 20, and post section 24 is telescopically secured to the upper end of post 22. The upper end of post section 24 terminates in upwardly and outwardly extending parallel flanges 26. Cylinder 28 has its outwardly extending piston rod pivotally secured to flanges 26 in any convenient fashion, and the lower end of the cylinder is pivotally secured to the bracket 29 which extends outwardly from the lower portion of post 22. As indicated by the dotted lines on the left-hand portion of FIG. 1, an extension of the piston rod of cylinder 28 by a source of hydraulic power (not shown) will cause post section 24 to move upwardly with respect to post 22.

A telescoping boom 30 is pivotally secured to flanges 26 at 32. This boom 30 is comprised of telescoping boom sections 34, 36 and 38 which have their angular position controlled by cylinder 40 which has its lower end pivotally secured to post section 24, and its upwardly extending piston rod pivotally secured to boom section 34. Cylinder 42 on the top of boom section 34 has its piston rod operatively secured to boom section 36 through cable and pulley means 37 to provide lifting power, and cylinder 42A serves to extend and contract boom 30. The lifting carriage means 42B on the outer end of boom section 38 is adapted to be secured to and to raise and lower a lifting fork or the like. The precise details of the telescoping boom 30 and the tilting cylinder 40 are completely disclosed in my co-pending application, Serial No. 344,762 filed February 13, 1964.

Figures 3, 4:
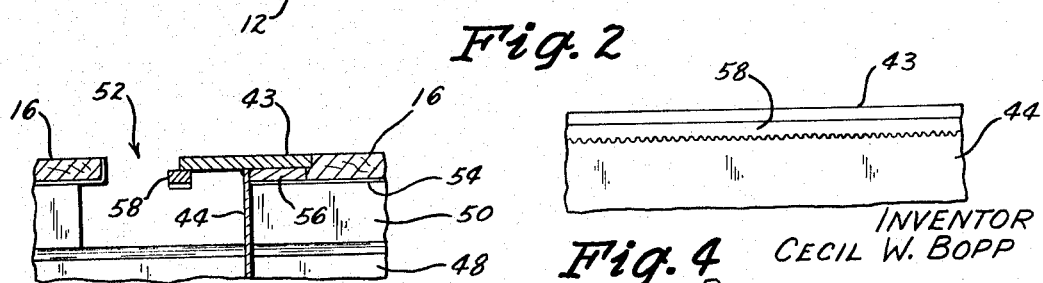
FIGURE 3 is a sectional view of the track means taken on lines 3—3 of FIGURE 2.
FIGURE 4 is a sectional view of the track means taken at right angles with respect to the sectional view of FIGURE 3 and taken on line 4—4 of FIGURE 2.

With reference to FIGS. 3 and 15, track 18 includes the top horizontal flange 43 of I-beams 44 which extend longitudinally of the trailer. These beams 44 are interconnected at their bottoms by cross bracing 46, and transversely disposed channels 48 extend through beams 44 below the tops thereof and are rigidly secured thereto by welding. Angles 50 are welded to the tops of channels 48 in spaced apart aligned relation to create track openings 52 between their adjacent ends. The upper flanges 54 of angles 50 (FIG. 3) serve to support bed 16. Filler plate 56 is secured to the outer lower portion of the flange 43 of beam 44, and the inner half of the flange extends inwardly over substantially half the width of the track opening 52. The vertical thickness of flange 43 is normally ½, ⅝, or ¾ inch, and it is this variation in thickness which requires that the upper track engaging rollers be adjustable, as will be discussed hereafter. An elongated gear rack 58 which is square in cross section and which has its teeth extending downwardly is welded or otherwise secured to the lower bottom portion of the inner half of flange 43 as clearly illustrated in FIG. 3.

Approximately half the width of rack 58 extends inwardly from the innermost edge of the flange 43.

The track 18 thus described is typical of all the trailer units disclosed herein. An extendible trailer 12A is illustrated in FIGS. 14 through 17. Trailer 12A includes a rearward portion 60 that is substantially identical to trailer 12. A forward trailer section 62 has a rearwardly extending frame section 64 that is slidably mounted between the beams 44 of the rearward trailer portion 60. As shown in FIG. 14, both the forward and rearward portions 62 and 60 include tracks 18 which are in continuous alignment when the two trailer portions are in their contracted positions.

The trailer unit 12B in FIG. 18 is substantially identical to the trailer 12 except that the tracks 18 are extended onto a frame extension 66 at either the forward or rearward end of the trailer. The extension 66 can be used to facilitate the removal of the pedestal 20 from the load surface.

The trailer unit 12C shown in FIG. 19 utilizes tracks 18 positioned on one side thereof. The bed 16A thereof extends forwardly past the half-cab unit 68 and the tracks 18 extend forwardly onto the bed portion 70 which is laterally adjacent the cab 68. Among the advantages of this arrangement of structure is that the bed area 70 affords a convenient storage space for the pedestal 20 and boom 30 when the trailer bed 16A is loaded.

A conventional motor-pump-hydraulic reservoir assembly 72 is mounted on pedestal 20 and provides the source of hydraulic power for the various components of the invention here involved. The details of the valves and hydraulic lines have not been shown in detail here because they are of conventional construction and do not of themselves comprise a part of this invention.

As indicated in FIG. 5, a hydraulically powered orbit motor 74 is secured by any convenient means within pedestal 20 and the power shaft 76 thereof extends downwardly therefrom. A vertically disposed idler shaft 78 is rotatably mounted within pedestal 20 by any convenient means and a sprocket chain 80 interconnects aligned sprockets on shafts 76 and 78. Sprocket chain 82 interconnects a second sprocket on idler shaft 78 with the large sprocket 84 (FIG. 1), which is rigidly secured to an extension 86 of vertical post 22. The motor 74 is operatively connected in conventional fashion to the power means 72, and the operation of the motor 74 acts through the components 76 through 86 to cause selective rotation of post 22, post section 24 and boom 30.

With reference to FIGS. 5, 6 and 10 through 13, pedestal 20 includes a pair of oppositely disposed bracket plates 88 in longitudinal alignment at either side of the pedestal. A supporting plate 90 (FIG. 10) extends between the center portions of plates 88 and is rigidly secured thereto. Each of the four plates 88 has a lower roller assembly 92 secured thereto for movably engaging the underneath side of the flange 43 of track beam 44 (FIG. 8). Lower roller assembly 92 includes an axle 94 which is welded within bore 96 of plate 88. Bearing plates 98 are rotatably mounted on the recessed outer end of axle 94 and are maintained in spaced relation by bushing 100 which is mounted between the plates on the axle. Lower rollers 102 are rotatably mounted on sub-axles 104, which are rigidly secured within aligned apertures 106 in the ends of plates 98.

The upper roller assembly 108 is adapted to movably engage the upper surface of flange 43 of beam 44 (FIG. 8). The upper roller assembly includes an axle 110 which has a cylindrical center portion 112, which has stub shaft 114 eccentrically mounted on one end and stub shaft 116 concentrically mounted on the other end. Eccentric stub shaft 114 is adapted to be rotatably received in aperture 118 in plate 88. Bushing 120 is mounted on the center of portion 112 of axle 110 and upper roller 122 is rigidly secured to the outer surface of bushing 120 through friction or other means. Spacer sleeves 121 on axle 110 at each side of bushing 120 serve to center the bushing and the roller 122 on the center portion 112 of the axle.

Eccentric member 124 has an eccentric bore extending therethrough and it is welded to the outer end 116 of axle 110. Shoulder 126 on member 124 is received in the opening 128 in side foot plate 130 of pedestal 20, and knuckles 132 on member 124 extend through the opening 128. A circular ring 134 is welded to the outer end of member 124 and ring 134 includes three concentric arcuate slots 136 adjacent its outer periphery. Six apertures 138 in plate 130 are adapted to receive bolts 140 which extend through slots 136 in ring 134. The ring 134 can be rotated by loosening bolts 140 and applying leverage to an appropriate tool within knuckles 132. This serves to eccentrically rotate axle 110 (with cooperation from the eccentrically disposed stub shaft 114 on the other end of the axle), and upper roller 122 can thereupon be moved upwardly or downwardly to engage flanges 43 on truck beams 44 which may vary in vertical thickness. The tightening of bolts 140 serves to maintain the predetermined position of the upper rollers.

As indicated in FIGS. 6, 7, 10 and 11, a power shaft 142 is rotatably supported on bearing elements 144 which are adjustably mounted on plates 90 by bolts or the like which extend through slots 146. Shaft 142 extends through opening 148 in plate 90. A sprocket 150 is keyed to shaft 142 in conventional manner as shown in FIG. 11. A hydraulic orbital motor (low speed and high torque) 152 is operatively secured to the end of shaft 142 (FIG. 6) and is also operatively secured to the hydraulic power unit 72. As shown in FIG. 6, pedestal 20 includes frame members 154 and 156 which encompass the upper rollers 122. Motor 152 is mounted on a frame member 154 and is protected by bar 158 which extends between members 154.

With reference to FIGS. 10 and 11, bars 160 and 162 are secured to the lower ends of a pair of bracket plates 88 by bolts or the like, and shaft 164 has its opposite ends journaled in aligned openings 166 in the bars. A sprocket 168 and gear 170 are keyed to shaft 164 in conventional fashion by key 172. Gear 170 is adapted to mesh with the teeth of gear rack 58. Thus, when motor 152 is operated to rotate shaft 142, shaft 164 is rotated by sprocket chain 174 which interconnects sprockets 150 and 168. The rotation of shaft 164 causes the rotation of gear 170, and the gear 170 will pull the pedestal along the rack 58 in a direction determined by the direction of rotation of the gear. As indicated in FIG. 6, the above described structure is duplicated at each end of shaft 142.

The pedestal 20 with attached boom 30 can be mounted on any of the truck structures 18 of the trailers 12, 12A, 12B or 12C, regardless of the thickness of the track flange 43, because the upper roller assembly 108 can be actuated by means of eccentric member 124 and plate 134 in the manner described above to move the upper rollers into engagement with the flange 43. The pedestal 20 can be completely removed from any one of the trailer units if desired by moving the pedestal to its rearmost position on the track and employing lifting or supporting means to receive the pedestal.

The pedestal 20 and boom 30 can be moved in the manner indicated for operational purposes anywhere along the length of tracks 18. The horizontal height of the boom 30 can be raised or lowered by actuating cylinder 28, and the tilt or vertical angle of the boom can be changed by actuating cylinder 40. The length of the boom 30 can be expanded or contracted by actuating cylinder 42A in the manner indicated in the above-described co-pending application. The post 22 and boom 30 can be rotated about a vertical axis (see dotted lines in FIG. 2) by actuating orbital motor 74 (FIG. 5) in the manner indicated.

Thus, it is seen that the device of this invention provides a loading and unloading means for trailers and the like with versatility of movement that has heretofore been unattainable in the art. As such, the stated objects of the invention have all been met.

Some changes may be made in the construction and arrangement of my combination vehicle trailer and lifting device without departing from the real spirit and purpose of my invention, and it is my intention to cover by my claims, any modified forms of structure or use of mechanical equivalents which may be reasonably included within their scope.

I claim:
1. In a trailer device adapted for use with a movable pedestal mounted lifting boom,
   a trailer frame,
   a bed surface on said frame,
   two elongated parallel spaced apart slot openings in said bed surface, a horizontal flange adjacent one side edge of each of said slot openings and extending laterally outwardly to partially close said opening, said horizontal flange extending no higher than the plane of said bed surface, said flanges adapted to movably receive the roller assemblies of a movable pedestal.

2. The combination of claim 1 wherein said trailer is comprised of a front bed portion that is movably secured to a rearward bed portion by means of an extendible frame member, with said flanges including flange portions on both of said bed portions which are in registering aligned positions when said bed portions are moved to abutting positions.

3. The combination of claim 1 wherein one of said flanges is adjacent one side edge of said trailer, with the other of said flanges being positioned inwardly towards the center of said bed surface, a vehicle cab on a forward end corner portion of said trailer, said tracks extending longitudinally adjacent the inward side of said cab.

4. The combination of claim 1 wherein said trailer includes a bed portion of a width less than said bed surface, said bed portion extending longitudinally from one end of said trailer, with said flanges extending longitudinally over said bed portion.

5. The device of claim 1 wherein an elongated gear rack with downwardly extending teeth is secured to the bottom of said flanges.

6. The device of claim 1 wherein said flanges are the top flange portions of beam structures which extend longitudinally with respect to said trailer frame.

7. The device of claim 1 wherein said bed surface is comprised of a front bed portion that is movably secured to a rearward bed portion by means of an extendible frame member comprising a part of said trailer frame, with track portions extending longitudinally on said rearward bed portion.

References Cited by the Examiner

UNITED STATES PATENTS

| | | | |
|---|---|---|---|
| 2,812,088 | 11/1957 | Cadillac et al. | 214—505 |
| 2,911,118 | 11/1959 | Tapp | 214—77 |
| 2,980,269 | 4/1961 | Zimmerman | 214—75 |
| 3,093,249 | 6/1963 | Wuesthoff | 212—55 |
| 3,095,099 | 6/1963 | Costello | 214—77 |
| 3,112,035 | 11/1963 | Knight | 212—55 |

HUGO O. SCHULZ, *Primary Examiner.*

ROBERT G. SHERIDAN, GERALD M. FORLENZA,
*Examiners.*